United States Patent [19]

Cha et al.

[11] 4,243,345

[45] Jan. 6, 1981

[54] PIPE HANDLING APPARATUS FOR REEL PIPE LAYING SYSTEM

[75] Inventors: John H. Cha; Wesley A. Brown, both of Orange, Calif.; Harry P. Weldon, London; Daniel G. Whyte, Amersham, both of England

[73] Assignee: Santa Fe International Corporation, Orange, Calif.

[21] Appl. No.: 58,523

[22] Filed: Jul. 18, 1979

[51] Int. Cl.³ .................... B63B 35/04; F16L 1/00
[52] U.S. Cl. .................... 405/168; 405/166; 242/158 R; 242/54 R
[58] Field of Search .................... 405/160–173, 405/159, 158; 114/65 A, 65 R, 254, 34 R; 242/158 R, 157.1; 226/24, 25, 172

[56] References Cited

U.S. PATENT DOCUMENTS

| | | | |
|---|---|---|---|
| 2,660,382 | 11/1953 | Wilson | 242/158 R |
| 3,237,438 | 3/1966 | Tesson | 405/168 X |
| 3,331,212 | 7/1967 | Cox et al. | 405/168 |
| 3,372,461 | 3/1968 | Tesson | 405/168 X |
| 3,630,461 | 12/1971 | Sugasti et al. | 242/54 R |
| 3,641,778 | 2/1972 | Gibson | 405/168 |
| 3,680,342 | 8/1972 | Mott et al. | 405/168 X |
| 3,712,100 | 1/1973 | Key et al. | 72/161 |
| 3,822,559 | 7/1974 | Matthews et al. | 405/166 |
| 3,982,402 | 9/1976 | Lang et al. | 405/168 |
| 4,157,023 | 6/1979 | Tisdale et al. | 405/168 X |

FOREIGN PATENT DOCUMENTS

601103  4/1948  United Kingdom .................... 405/168

Primary Examiner—Dennis L. Taylor
Attorney, Agent, or Firm—LeBlanc, Nolan, Shur & Nies

[57] ABSTRACT

An offshore system for laying a continuous length of pipe on the sea bottom from a pipe-carrying reel adapted to be mounted on a carrier vessel having an improved pipe handling and conditioning apparatus for working on the unspooled pipe. The improved apparatus includes a pipe straightener for imparting a reverse plastic bending moment to the unspooled pipe passing therethrough, and which comprises at least two pairs of pipe support rollers, each pair being aligned along the pipe path and mounted for rotational movement about respective rotational axes normal to the pipe path and parallel to the plane of the deck of the carrier vessel, and for pivoting movement about a pivot axis located between and substantially parallel to the respective rotational axes. A straightener carriage mounts the pipe straightening means for movement (1) about a pivot axis substantially parallel to the rotational axis of the reel, (2) in a substantially vertical direction relative to the deck of the carrier vessel, and (3) in a direction substantially parallel to the rotational axis of the reel.

19 Claims, 17 Drawing Figures

PIPE HANDLING APPARATUS FOR REEL PIPE LAYING SYSTEM

BACKGROUND OF THE INVENTION

The present invention relates to reel pipelaying systems. More particularly, the invention relates to an improved portable reel pipelaying system for use on a variety of water-borne vessels. Still more particularly, the invention relates to improved pipe handling apparatus for such portable reel pipelaying systems.

Historically, the technique of laying undersea fluid-carrying pipelines had its rudimentary beginnings in England in the 1940s. See, e.g., Blair, J. S., "Operation Pluto: The Hamel Steel Pipelines", Transactions of the Institute of Welding, Feb. 1946; and British Pat. No. 601,103 (Ellis), issued Apr. 28, 1948. The concepts described in the Blair article and Ellis patent were used in the wartime operation known as "Operation Pluto", wherein three-inch uncoated steel pipeline was laid across the English Channel. No known further development work or commercial use of the wartime technique of laying pipe offshore from reels was carried out after World War II until about 1960 when research into the reel pipeline technique was renewed by a company in New Orleans, Louisiana. Out of this research came the first known commercial pipelaying reel barge, called the U-303, the substance of which is described in U.S. Pat. No. 3,237,438, issued Mar. 1, 1966, to P. A. Tesson, and assigned, by mesne assignments, to Santa Fe International Corporation, assignee of the invention described herein; see also U.S. Pat. No. 3,372,461 to P. A. Tesson, issued Mar. 12, 1968 as a division of said Tesson U.S. Pat. No. 3,237,438 and commonly assigned therewith.

Tesson was apparently the first to appreciate the necessity for incorporating means for straightening the pipe into the reel pipelaying system in order to make the technique commercially competitive with the traditional stovepiping method of laying pipe offshore. The Tesson invention described in the aforesaid U.S. Pat. No. 3,237,438, combined a pipe straightener and level winder mechanism which was employed for spooling pipe onto the reel evenly and for straightening pipe as it was unspooled. Variations of Tesson's original straightener/level winder have been used with substantially all known subsequently developed offshore reel-type pipelaying systems.

The commercial successor to the U-303 is currently operated by Santa Fe International Corporation in the Gulf of Mexico and is known in the trade as the "Chickasaw"; various aspects of the "Chickasaw" reel pipelaying barge are described in the following U.S. patents, all assigned to the assignee of the invention described herein: U.S. Pat. No. 3,630,461, issued Dec. 28, 1971, in the names of Daniel E. Sugasti, Larry R. Russell, and Fred W. Schaejbe; U.S. Pat. No. 3,641,778, issued Feb. 15, 1972 in the name of Robert G. Gibson; U.S. Pat. No. 3,680,342, issued Aug. 1, 1972, in the names of James D. Mott and Richard B. Feazle; and U.S. Pat. No. 3,712,100, issued Jan. 23, 1973 in the names of Joe W. Key and Larry R. Russell.

Currently in the final construction phases by or on behalf of Santa Fe International Corporation is the first known fully integrated self-propelled reel-type pipelaying ship. The essential features of this new and different vessel are described in U.S. Pat. No. 3,982,402, issued Sept. 28, 1976 in the names of Alexander C. Lang and Peter A. Lunde, and assigned to Santa Fe International Corporation; and in U.S. Pat. application Ser. No. 903,180, filed May 5, 1978 in the names of Charles N. Springett, Dan Abramovich, Stanley T. Uyeda, and E. John Radu; and U.S. Pat. application Ser. No. 903,181, filed May 5, 1978, in the names of Stanley T. Uyeda, E. John Radu, William J. Talbot, Jr., and Norman Feldman. Said Springett et al Ser. No. 903,180 and Uyeda et al Ser. No. 903,181 applications are assigned to Santa Fe International Corporation; the disclosures of each of said Lang et al patent and Springett et al and Uyeda et al applications are incorporated herein by reference as those each were set forth in full below.

The reel-type pipelaying systems described in the several aforementioned commonly assigned U.S. Patents are essentially all of the type which are permanently mounted to a vessel or integrated into the basic construction of a vessel (e.g., barge or self-propelled ship). Another important type of reel pipelaying system is described in U.S. Pat. application Ser. No. 909,260, filed May 24, 1978, in the names of Stanley T. Uyeda and John H. Cha and assigned to Santa Fe International Corporation. Said Uyeda et al application Ser. No. 909,260, the disclosure of which is incorporated by reference herein in its entirety as though set forth in full below, describes a portable reel-type pipelaying system in which the several component parts are unitized for portability. The embodiment of the portable reel pipelaying system described in the Uyeda et al. application Ser. No. 909,260 was designed and constructed for use primarily on supply boats and for operations in relatively shallow waters (up to about 250-400 feet deep).

After the portable reel pipeline apparatus described in the aforesaid Uyeda et al. application Ser. No. 909,260 was first placed into commercial operation off the coast of Australia in about July, 1978, it was discovered that the straightener apparatus thereof sometimes caused buckling of pipe and/or damage to the pipe coating; it was found that due to the profile of the pipe as it came off the reel, the pipe was subjected to excessive loading within the straightener assembly.

SUMMARY OF THE INVENTION

The present invention was designed and intended to provide a portable versatile reel pipelaying system, suitable for use on a variety of offshore vessels for laying pipe of up to 8" diameter in a wide range of water depth, from the relatively shallow water in the Gulf of Mexico (50'-200') to and including deep water, such as found in the North Sea (200'-1,000' depths or more).

The present invention incorporates features which allow for laying a relatively wide range of pipe (2" O.D.-8" O.D.) in water depths up to about 1,000' or more. This capability is provided in a relatively compact and portable apparatus. Further, this invention incorporates features which overcome problems found in prior art apparatus of this type. More particularly, the invention overcomes problems found to be associated with the commercial embodiment of the apparatus described in the pending Uyeda et al application Ser. No. 909,260.

The present invention provides a new and improved straightener/level wind assembly for safely handling the pipe (including straightening the pipe under tension) as it travels from the reel into the water. Key features of the invention include the pivot mounting of the straightener mechanism to the straightener cart and support frame, the vertical adjustability of the straightener mechanism, and the configuration of the straightener rollers.

This invention also incorporates an improved stern pipe guide assembly. The construction of this new pipe guide assembly permits pipe to be laid under less tension for a given water depth or, conversely, to a greater depth for a given amount of applied tension.

BRIEF DESCRIPTION OF THE DRAWING

FIGS. 6A, B, C show the ratchet mechanism mounting the straightener platform to the straightener support frame in travel, intermediate, and locked positions, respectively; and, FIG. 7 is a side view of the pipe guide roller assembly.

DESCRIPTION OF THE PREFERRED EMBODIMENT

Figure 1A:
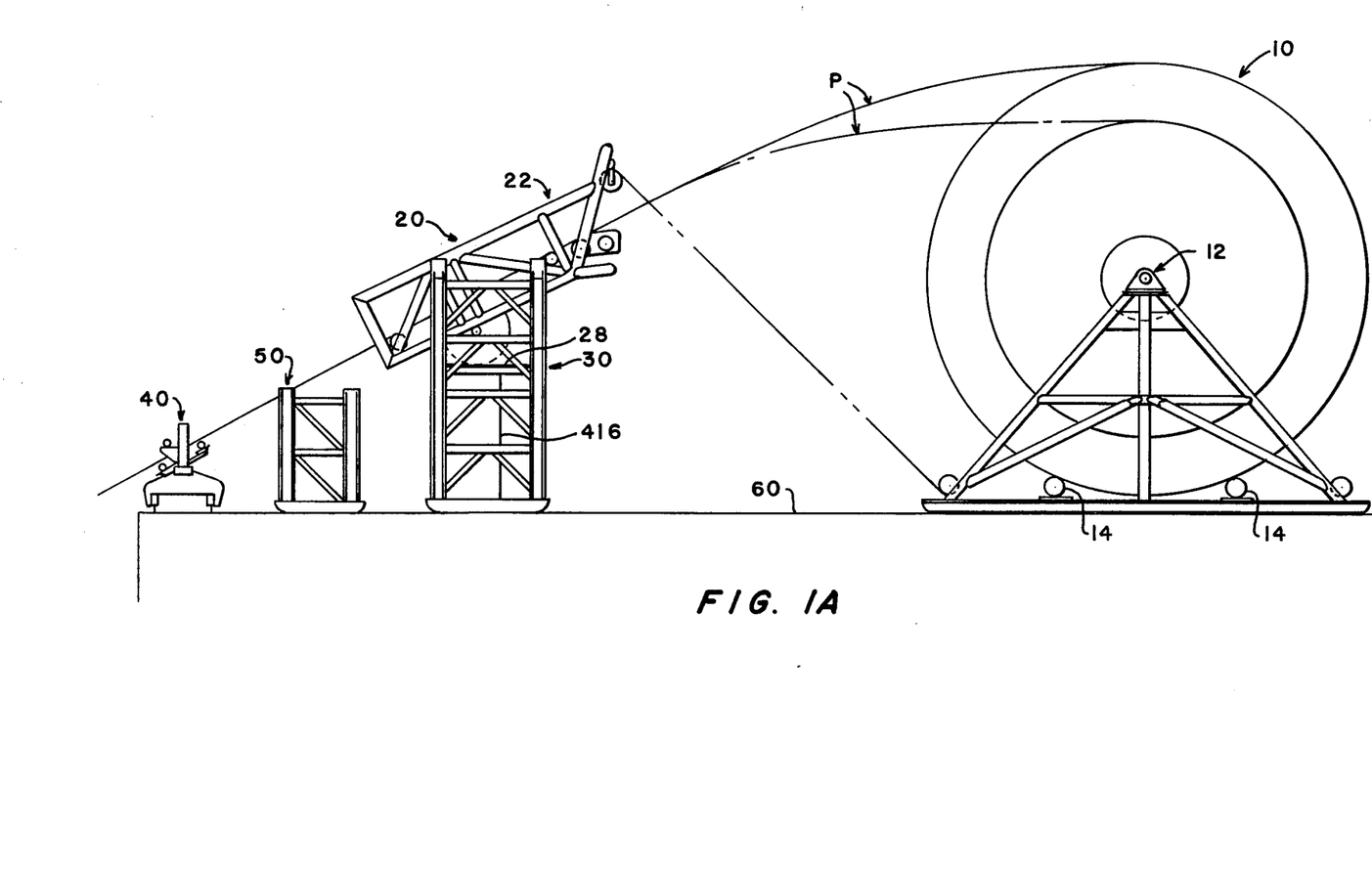
FIG. 1A is a side view of the reel pipe laying system mounted to the deck of a carrier vessel.
Figure 1B:
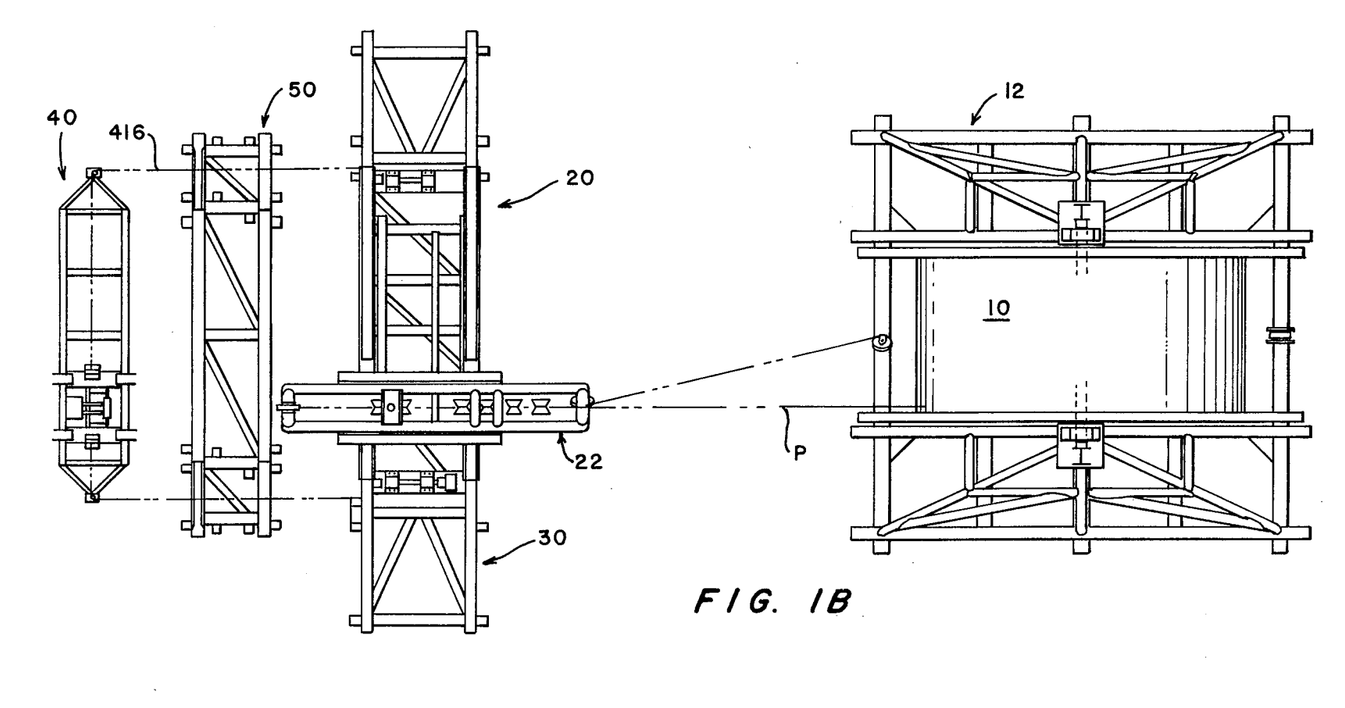
FIG. 1B is a plan view of the reel pipe laying system.

FIG. 1 shows an overall side view of the principal elements of the portable reel pipelaying system of this invention. A continuous length of pipe (designated P and represented by its center line) may be spooled onto a reel 10 mounted on a support base 12 for rotation about a horizontal axis. A reel mounted in such a way is known in the industry as a "vertical reel". The reel is driven by one or more (preferably two or four) motors 14; these may be electrically or hydraulically operated. Suitable reel drive motors are known (e.g. Hagglund A4170-X-00C0 hydraulic motor).

Prior to being spooled on the reel and after being unspooled therefrom, the pipe passes through a level wind/straightener assembly 20 and a pipe guide roller assembly 40. Intermediate the level wind/straightener assembly 20 and the pipe guide roller assembly 40 is a work platform assembly 50. The reel 10, its support assembly 12, the level wind/straightener assembly 20, the pipe guide assembly 40 and the work platform assembly 50 are advantageously and preferably operatively mounted to the deck 60 of a carrier vessel from which it is desired to lay pipe offshore. There herein described apparatus may be mounted on any vessel having sufficient clear deck space, including single or multiple hull barges, self-propelled ships, such as supply boats and the like, semi-submersible towed or self-propelled barges, etc.

Figure 2:
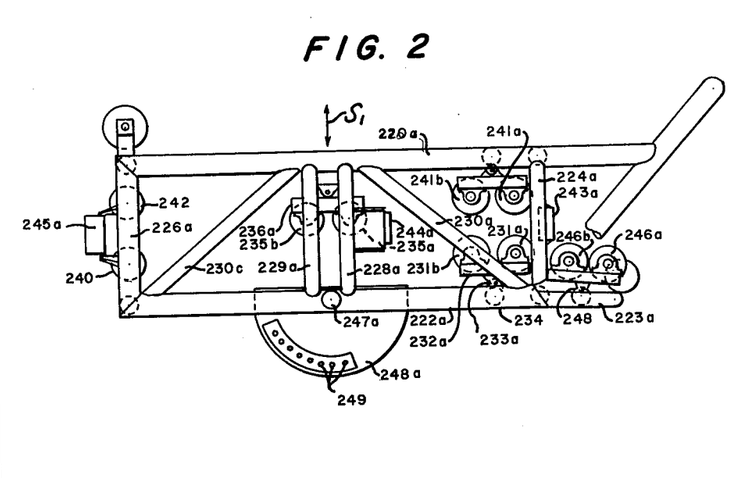
FIG. 2 is a side view of the straightener assembly.
Figure 2A:
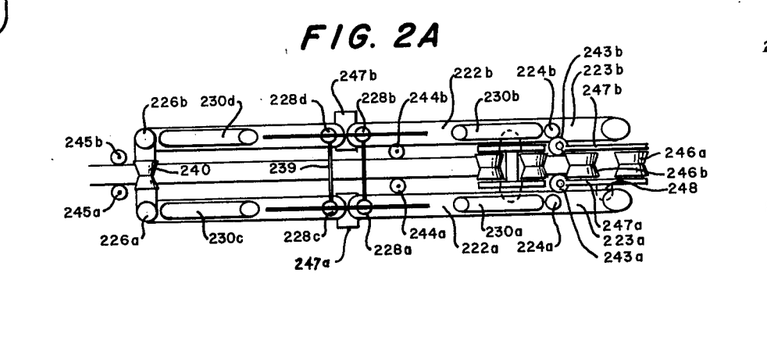
FIG. 2A is a plan sectional view of the straightener assembly taken along line A—A in FIG. 2.
Figure 2B:
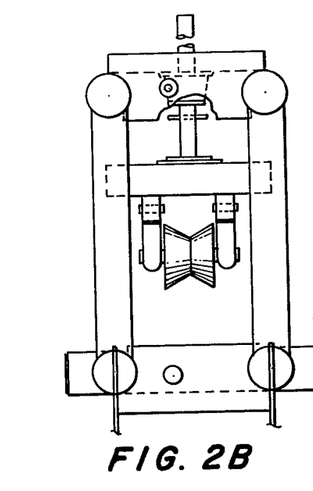
FIGS. 2B-2D are sectional views of the straightener assembly taken along lines B—B, C—C and D—D, respectively, in FIG. 2.
Figure 2C:
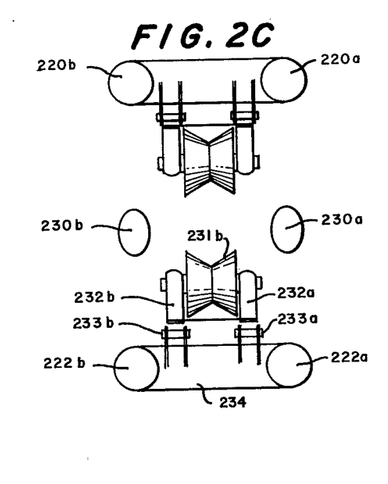
Figure 2D:
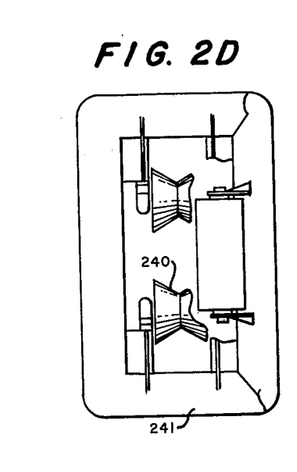

The level wind/straightener assembly 20 comprises a straightener assembly 22, a straightener cart 26, a straightener platform 28 and a straightener support frame 30. Details of the straightener level wind assembly 20 are shown in FIGS. 2-2D.

The straightener assembly 22 comprises a main, generally rectangular frame having longitudinal top members 220a, 220b, longitudinal bottom members 222a, 222b, forward vertical members 224a, 224b, aft vertical members 226a, 226b, intermediate vertical members 228a, 228b, 229a, 229b, and diagonal braces 230a, 230b, 230c, 230d. Roller support members 223a, 223b, extend from the forward ends of bottom longitudinal members 222a, 222b, respectively, such that the center lines of members 222 and 223 define an angle which is preferably less than 10° and more preferably approximately in the range of about 5°-6°.

The straightener assembly 22 comprises a "three-roll" straightener; that is, the straightener provides three reaction points against which the pipe passing through the straightener assembly reacts. The basic concept of a three-roll straightener is described in the aforementioned U.S. Pat. No. 3,237,438; the disclosure of said Tessen U.S. Pat. No. 3,237,438 is incorporated by reference thereto as though fully set forth herein.

The first reaction point (or first roller assembly) comprises a first pair of horizontal axis roller assemblies 231a, 231b, mounted one behind the other to roller support members 232a, 232b. The roller support members 232 in turn are pivotably mounted about pivot axes 233a, 233b, to a cross member 234 extending between lower straightener frame members 222a and 222b. Thus, roller assemblies 231 are pivotable about an axis lying substantially normal to the nominal pipeline path P extending through straightener assembly 22.

The second reaction point (or second roller assembly) comprises a second set of transverse horizontal axis roller assemblies 235a, 235b, the bearing mounts of which are secured (e.g. welded) to roller support members 236a, 236b. Support members 236 in turn are mounted to a cross member 238 by pivot mounts 237a, 237b such that roller assemblies 235 are pivotable about an axis substantially normal to the nominal pipeline path P through the straightener assembly 22.

The cross member 238 is in turn fixed to an adjustment mechanism, generally designated 239, such as a hydraulic cylinder or screw type jactuator (e.g. Duff-Norton model 1835) having a hydraulic motor drive (not shown). The end portions of cross member 238 lie between respective pairs of vertical members 228 and 229, which act as guides to prevent longitudinal movement of the second roller assembly while permitting vertical adjustment thereof. The rollers 235 comprising the second reaction point are thus adjustable in the direction of arrow $S_1$ toward and away from the nominal pipeline path P; in this way, the magnitude of the bending forces applied to the pipe passing through the straightener assembly can be varied as required to straighten the pipe after it is unspooled.

The third reaction point (or third roller assembly) comprises at least one transverse horizontal axis roller assembly 240, the bearing supports of which are mounted to a lower rear cross member 241 of the straightener assembly 22. Although the single roller assembly 240 could be replaced by a pair of pivotably mounted roller assemblies similar to those of the first and second roller assemblies, such arrangement has not been found necessary based on use of the apparatus described in aforementioned co-pending application Ser. No. 909,260.

A pair of pivotably mounted roller assemblies 241a, 241b is located above roller assemblies 231a, 231b to provide an alternate first reaction point. Similarly, a roller assembly 242 is located above roller assembly 240 to provide an alternative third reaction point.

In the arrangement shown in FIG. 2, the second roller assembly 235 exerts a downward bending force on the pipe against the upward bending forces exerted by roller assemblies 231 and 240. Such arrangement is normally employed when unspooling overwound pipe, (i.e., pipe which has been spooled over the top of the reel as shown in FIG. 1a). To straighten pipe unspooled from an "underwound" arrangement (i.e., the pipe having been spooled onto the bottom of the reel), roller assembly 235 as well as its adjustable mounting members would be reversed from the arrangement shown in FIG. 2 and the stationary parts (e.g., hydraulic cylinder) mounted to cross plate 239. In this alternate arrangement, roller assembly 235 could be adjusted to exert a desired upward bending force on the pipe against downward bending forces exerted by the first and third roller assemblies 241 and 242, respectively.

A first pair of transversely opposed vertical axis guide rollers 243a, 243b is mounted to the straightener assembly frame just forward of the first reaction point roller sets 231/241. A second pair of transversely opposed vertical axis guide rollers 244a, 244b, is mounted to the straightener assembly just forward of the second roller assembly 235. A third pair of transversely opposed vertical axis rollers 245a, 245b is mounted to the straightener assembly frame just aft of the third roller assemblies 240/242.

The several vertical and horizontal axis roller sets described above serve to define the nominal pipeline path P through the straightener assembly 22. The vertical axis guide rollers 243, 244, 245 inhibit lateral movement of the pipe relative to the roller assemblies 231, 235 and 240.

A forward set of horizontal axis guide roller assemblies 246a, 246b is mounted to roller support members 247a, 247b which in turn are pivotably mounted to a cross member 248 extending between lower frame member extensions 223a, 223b. This roller assembly 247 acts as a forward pipe support. It may also function as a pipe curvature control device, depending upon the size (e.g. diameter and grade) of the pipe and the lay or exit angle of the pipe off the vessel. For small diameter pipe (e.g. 2"–6" O.D.) and relatively shallow lay angles (e.g. 5°–15°), roller assembly 247 would provide no curvature imparting function. For larger diameter pipe (e.g. 8" O.D.) and steep lay angle (e.g. 30°–35° or more), the roller assembly 247 may bend the pipe to a relatively uniform radius of curvature prior to straightening the pipe in straightener assembly 22.

The forward roller assembly 247 is adjustably mounted to be movable toward or away from the nominal pipe path independently of the straightener assembly. This may be accomplished through the use of shims, or a jacking type arrangement (similar or equivalent to that used to move adjustable straightener roll assembly 235), or the like, as would be apparent to one skilled in the pertinent art. Such independent adjustments of the forward pipe support roller assembly are made after the vertical height and angle of the straightener assembly have been set to thereby provide optimum forward support for a given size of pipe.

A pair of opposed tubular members 247a, 247b extend transversely from lower frame members 222a, 222b, respectively, approximately midway between frame end members 224, 226. Members 247 serve as stub shafts and define a pivot axis about which the entire straightener assembly 22 is rotatable. Semi-circular plate members 248a, 248b are fixed (e.g. by welding) to and extend downwardly from bottom frame members 222a and 222b, respectively. The center of radius of each member 248a, 248b is substantially coincident with the straightener assembly pivot axis defined by the longitudinal centers of stub-shaft members 247. Each of members 248a, 248b has a plurality of through holes 249 formed therein adjacent the periphery of each member 248a, 248b. Preferably, through holes 249 have a pre-determined spacing therebetween. Advantageously, eight through holes may be provided spaced approximately 5°–10° apart so that the straightener assembly 22 is adjustable over a range from about 0° to about 35°–60°, depending on the number of holes.

Figure 3A:
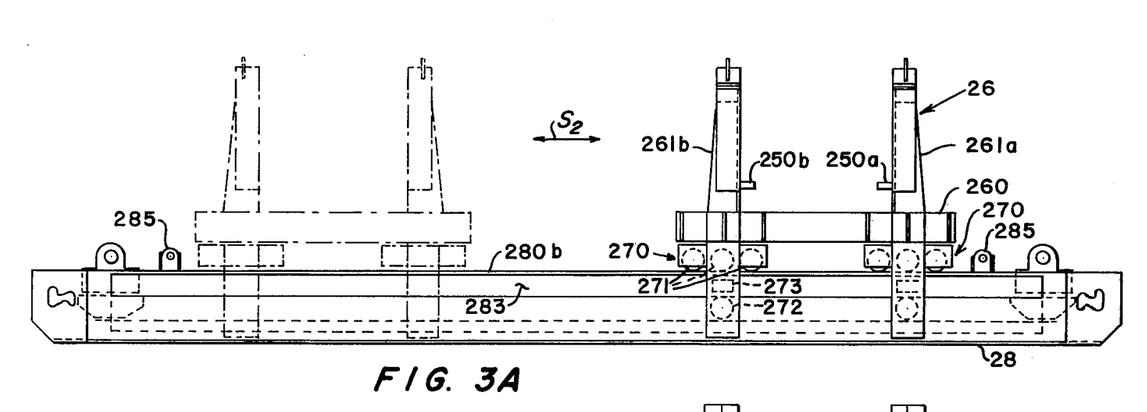
FIG. 3A is an end elevation of the straightener cart and platform.
Figure 3B:
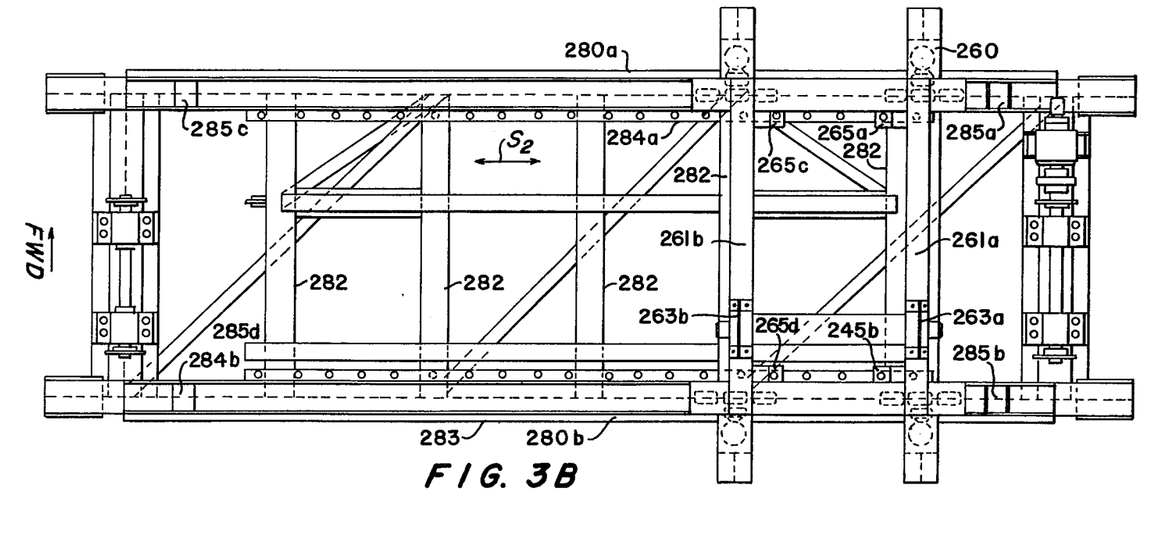
FIG. 3B is a plan view of the straightener cart and platform.
Figure 3C:
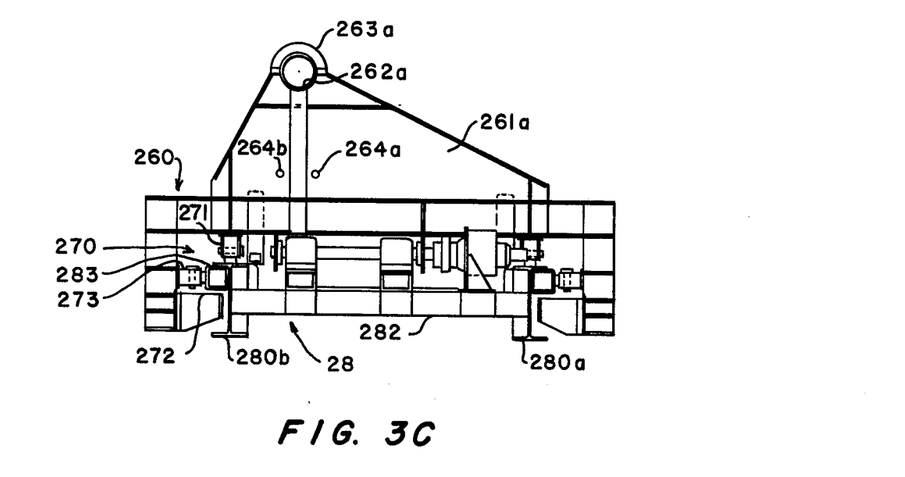
FIG. 3C is a side view of the straightener cart and platform.

The straightener assembly 22 is mounted to a straightener cart 26 which rides on a straightener platform 28. The straightener cart assembly 26 comprises a rectangular open based frame 260 supporting a pair of upstanding side members 261a, 261b. At its upper portion each side member 261 has a semi-circular recess 262 in which corresponding stub shaft member 247 seats. A member 263, also having a semi-circular shape fits over and is preferably bolted to member 261 to secure the stub shaft 247 against other than rotational movement. Each support member 261 has at least one, and preferably two, holes therethrough in alignment with corresponding holes 249 in plate members 248a, 248b. One or more locking pins 250a, 250b, which are extendable through aligned openings 264 and 249 may be used to lock the straightener assembly 22 against rotational movement about the axis through stub shaft 247.

It is noted that the pivot axis of the straightener assembly 22 is located at or near the longitudinal center of the straightener assembly 22. By virtue of this advantageous location of the straightener assembly pivot axis, there is no excessive weight distribution to one side or the other of the pivot axis due to the weight of the straightener assembly. The moment arm from the pivot axis to the locking pins is therefore relatively small and the locking pins 250 may be of a practical and manageable size.

Figure 3D:
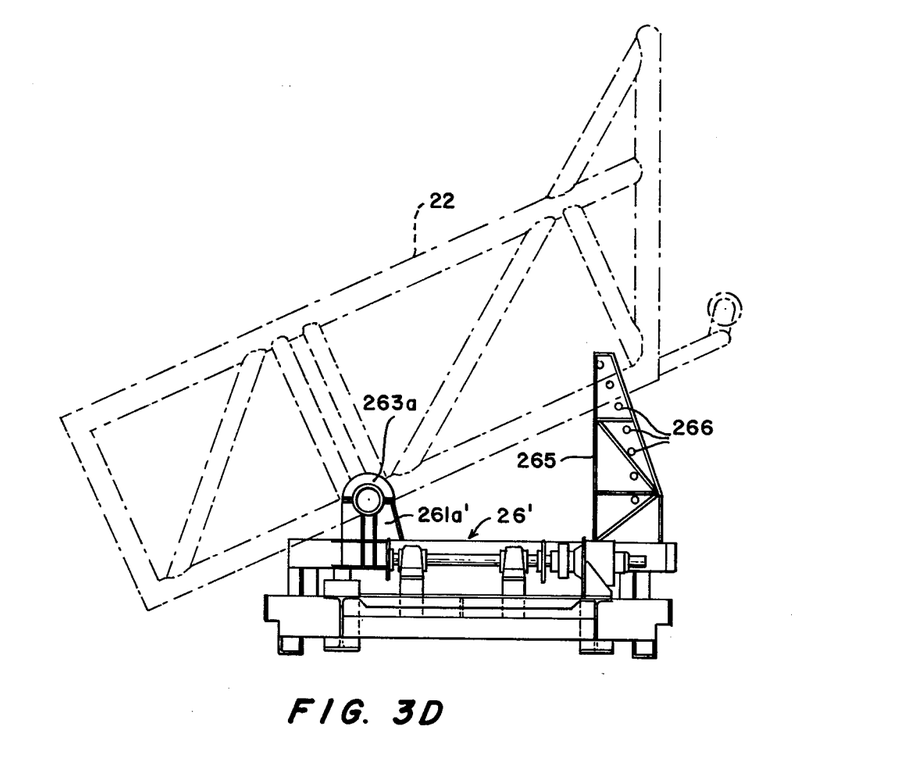
FIG. 3D is a side view of a modified form of the straightener cart.

In an alternate arrangement shown in FIG. 3D, the straightener cart 26' has a pair of upstanding support members 265 (only the starboard side member being shown). Members 265 have a plurality of through holes 266 formed in an arcuate pattern. Plates (not shown) secured to straightener frame members 222 have matching through holes which align with desired holes 266; locking pins are passed through the aligned openings to secure the straightener assembly 22 at the desired angle.

Lifting hooks are provided on the straightener assembly 22 to enable a crane line to be connected to the straightener assembly for pivoting the straightener to the desired angle as a function of pipe diameter, exit angle, etc. Alternatively, hydraulic cylinders mounted to and between the straightener assembly frame and straightener cart may be used as a driving source to rotate the straightener assembly about its pivot axis.

The straightener cart frame 260 is supported on roller assemblies, generally designated 270. Each roller assembly 270 comprises upper and lower horizontal axis guide rollers 271, and 272, respectively and vertical axis guide rollers 273.

The straightener platform 28 comprises a generally rectangular framework composed of fore and aft I beams 280a, 280b connected by intermediate cross bracing members 282 to provide structural strength and rigidity to the straightener platform structure. Tubular members 283 may be secured (e.g. by welding) to I beams 280 as shown in FIGS. 3a and 3c. Rollers 271 ride on the upper flange of I beam 280; rollers 272 and 273 ride on the bottom and side surfaces, respectively, of member 283. This arrangement allows movement of the straightener cart 26 and straightener 22 only in the directions of arrow $S_2$ while inhibiting movement off the track defined by I beams 280. A slightly different but functionally similar arrangement is shown in commonly assigned co-pending application Ser. No. 909,260, filed May 24, 1978 (and in British patent application No. 22079/78, corresponding hereto, also filed May 24, 1978).

The straightener cart incorporates one or more, and preferably four, locking pads 265 having holes therethrough which mate with corresponding holes in members 284 secured to the straightener platform frame. Locking pins (similar to locking pins 249) may be inserted in the aligned holes of pads 265 and members 284 to lock the straightener cart 26 against movement in the direction of arrow $S_2$. Normally, the straightener assembly would be locked against movement except during a pipe spooling or laying operation.

The straightener platform 28 is mounted to the straightener assembly support frame 30 for vertical adjustment. In the presently preferred embodiment of this invention, vertical adjustment of the straightener platform would be accomplished by connecting crane lines to pad eyes 285.

The end portions of frame members 280 incorporate a locking mechanism (FIGS. 4a–4c) which mate with the support frame as described in detail below to support the straightener cart in one of a number of pre-determined desired vertical positions. Side plates 286 extend between the upper and lower flanges of I beams 280. Each of plates 286 and I beam 280 have axially aligned "Z" shaped openings 288, through which a locking pin 289 extends.

Figure 5A:
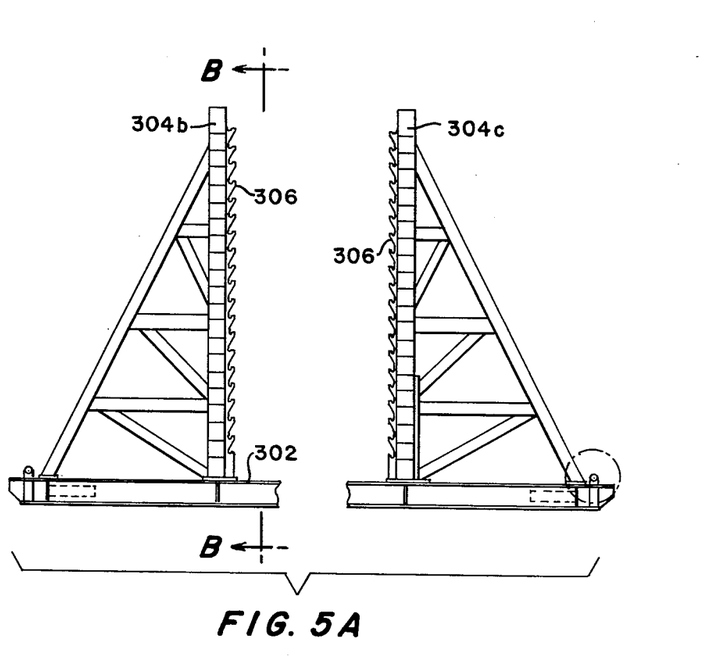
FIG. 5A is a broken end elevation of the straightener assembly support frame.
Figure 5B:
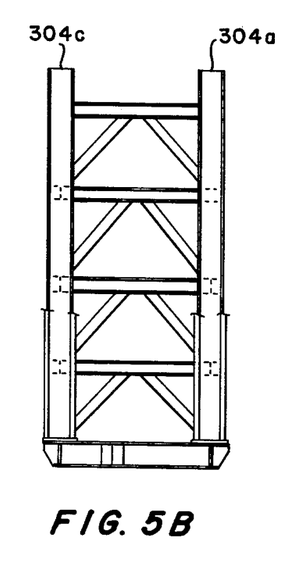
FIG. 5B is a sectional view taken along line B—B in FIG. 5A.

The straightener assembly support frame 30 comprises a generally rectangular skid base 302 and four upright members 304. Additional bracing members may be provided to take up transverse loads on the vertical support members 304. The inner facing surfaces of vertical support 304 have angled faces 305 terminating in a series of rungs 306 on which pins 289 rest. Angled faces 305, rungs 306 and pins 289 comprise a ratchet-like arrangement for raising and lowering the straightener cart 28 incrementally and with a minimum of manual effort.

Figure 4A:
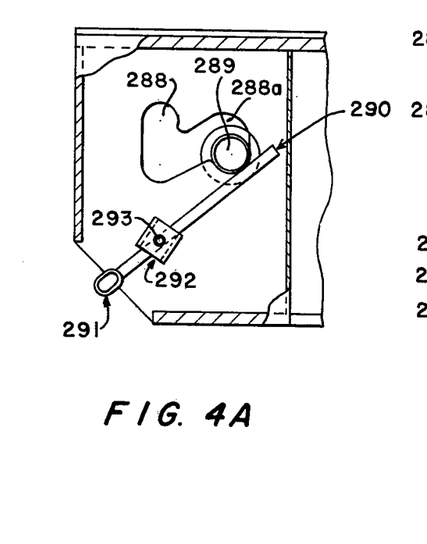
FIG. 4A is a side view of the locking mechanism for mounting the straightener platform to the straightener support frame.
Figure 4B:
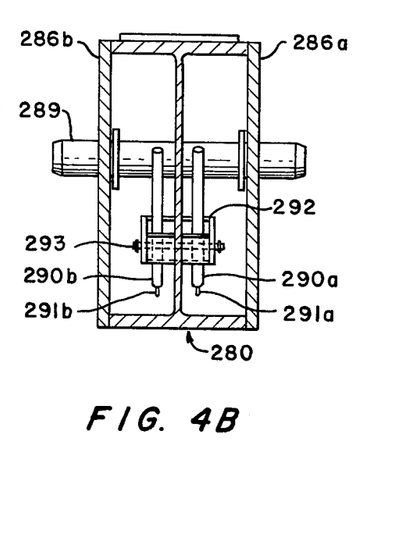
FIG. 4B is a sectional view of the locking mechanism taken along line B—B in FIG. 4A.

The straightener platform 28 is provided with an unlatching mechanism comprising a pair of elongated members 290, having pad eyes 291 at one end, secured in a housing 292 for rotation about a pivot axis 293. Members 290 engage locking pin 289; by pivotal movement of members 290 about pivot axis 293, locking pin 289 is shifted between regions 288a and 288b of cammed openings 288.

Figure 6:
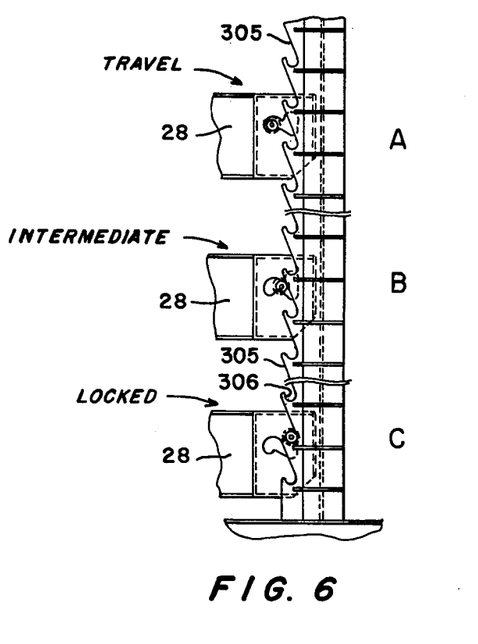

FIG. 6 shows the straightener platform 28 in "locked", "intermediate", and "travel" positions relative to rungs 306. A rope or cable (not shown) attached to pad eyes 291 may be provided to enable the operator to pivot elongated members 290 and thereby move the locking pin 289 out of its travel position in region 288a (as shown in FIG. 4a and FIG. 6a) and toward and into its locking position in region 288b (see FIG. 6c). The angled faces 305 of members 304 are dimensioned relative to the locking mechanism on the straightener platform 28 so that as the platform is raised out of its locked position (FIG. 6c), the angled faces 305 guide the locking pins 289 toward and into region 288a to set therein. The platform 28 may then be moved up and down at will until members 290 are pivoted to move the locking pins 289 back toward and into region 288b to seat in rungs 306.

The straightener platform 28 also mounts the level wind drive mechanism. Movement of the straightener cart along the track defined by I beams 280 is controlled by a hydraulic motor/chain drive arrangement similar to the level wind drive mechanism described in aforementioned co-pending application Ser. No. 909,260 and reference is made to said application Ser. No. 909,260 for the description of a level wind drive mechanism suitable for use herein.

In this invention, the front guide roller assembly, the first straightener roller assembly, and the second straightener assembly each comprises a pair of rollers rotably mounted about a pivot axis. The pivotably mounted double roller arrangement is particularly useful for working on pipe larger than 4" O.D. Thus, 8" O.D. pipe is considerably stiffer than 4" O.D. pipe and requires more bending forces to straighten it. As the straightening forces increase, so does the likelihood of damage to the pipe and/or coating (as found, for example, with the commercial embodiment of the system described in the Uyeda et al Ser. No. 909,260 application). Using a pivotably mounted two roller arrangement is advantageous in that it provides an increased bearing surface relative to a single roller arrangement and approximates a track-type assembly such as used, for example, on the aforesaid Santa Fe reel barge "Chickasaw", and described in above-noted U.S. Pat. No. 3,680,342 to Mott et al. The disclosure of the aforesaid U.S. Pat. No. 3,680,342 is incorporated herein by reference as though set forth in full below.

The pivot mounting of the roller assembly allows the rollers to seek the slope of the pipe and to maintain a double roller contact with the pipe at all significant times. It has been found that for apparatus of the type described herein, the use of two rollers for each roller assembly is a practical upper limit; it has been found that the pipe bears only on the two outer rollers due to the curvature of the pipe itself. Thus intermediate rollers between the two outer rollers would not serve as load-bearing surfaces and would likely be extraneous.

The pipe straightening means of this invention is constructed to be movable in three directions: (a) pivotably about the pivot axis of stub shafts 247; (b) vertically through as many positions as there are rungs 306 on vertical support members 304; and (c) laterally along the straightener platform guide rails 280. Adjustment of the straightener assembly 22 pivotably and vertically is determined as a function of, inter alia, pipe size, water depth and tension to be applied to the pipe during a pipe lay operation. The combination of pivotal and vertical adjustment capability allows the apparatus of this invention to be used over a substantially wider range of water depths and on a greater variety of vessels than has heretofore been possible with known reel pipelaying apparatus.

The pipe guide assembly 40 may be substantially the same as the stern pipe guide assembly shown and described in aforesaid the Uyeda et al Ser. No. 909,260 application. The pipe guide assembly 40 is preferably and advantageously driven with the straightener assembly 20 to follow the traversing of the straightener assembly. A cable drive mechanism similar to that shown in the aforesaid co-pending application Ser. No. 909,260 is suitable for use in the embodiment described here.

Figure 7:
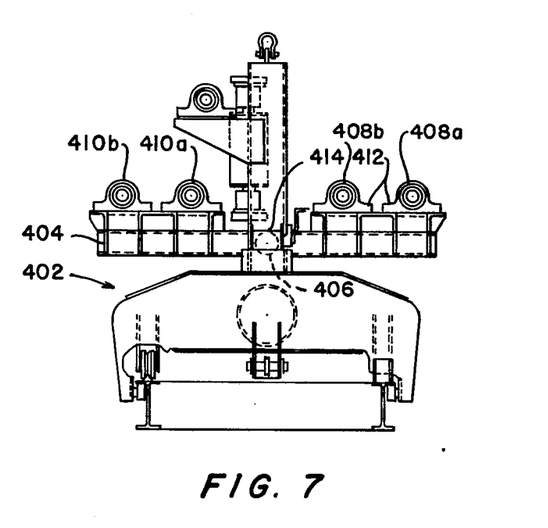

A modified version of the pipe guide assembly 40 is shown in FIG. 7 hereof. In this embodiment, a roller carriage 402 supports a roller bed 404 for rotational movement about a pivot axis mounting 406. A first pair of horizontal axis pipe support rollers 408a, 408b are mounted to the roller bed 404 forward of pivot axis 406. A second pair of horizontal axis pipe support rollers 410a, 410b are mounted to the roller bed 404 aft of the pivot axis 406. Each roller is rotatably mounted in and supported by pillow blocks 412 in a known manner. The pillow blocks are mounted to the roller bed 404 through resilient pads, advantageously and preferably made of neoprene or urethane.

The pipe guide assembly arrangement described above with reference to FIG. 7 is highly advantageous as compared to prior pipe guide assemblies, including that shown in the aforesaid Uyeda et al application Ser. No. 909,260. In particular, the four roller arrangement of assembly 40 allows substantially increased control of the pipe profile (i.e., geometry of the pipeline) and allows for substantial variation in the profile between the pipe straightener assembly 20 and the pipe guide assembly 40. In prior art arrangements, such as shown in the aforesaid Uyeda et al application Ser. No. 909,260, it is necessary to maintain the pipe profile or pipeline geometry substantially the same at the straightener assembly and at the pipe guide assembly. Thus, the angle of the pipeline (relative to the water surface or carrier vessel deck, both represented by a nominal horizontal plane) must be maintained substantially the same at both the straightener assembly and the pipe guide assembly.

With the four roller arrangement of this invention, the angle of the pipeline at the pipe guide assembly and the angle of the pipeline at the straightener assembly may differ by as much as about 5°. This permitted variation means that less tension is required for a given set of conditions. Conversely, since more tension is available, the pipe can be laid in deeper water. The use of four rollers mounted on resilient pads provide significantly improved pipe support with automatic optimizing of the pipe/roller contact, while at the same time reducing the reaction loads imparted to each roller by the pipe.

A pair of winches 414 are mounted to the carriage 402, advantageously on opposite sides of the roller bed 404. The cables (not shown) connecting the straightener assembly 20 and pipe guide assembly 40 each have one end fixed to opposite sides of the straightener cart 26; the opposite ends of these cables are spooled on the drums of winches 414. As the straightener cart 26 is raised or lowered for a particular pipelaying operation, the connecting cables are spooled off or onto the winch drums as necessary to maintain adequate tension on these connecting cables so that the pipe guide assembly properly follows the straightener assembly as the latter traverses to level wind pipe onto the reel or follow the pipe as it is unspooled.

The invention described here may be embodied in other specific forms without departing from the spirit or essential characteristics thereof. The embodiment described above is therefore to be considered in all respects as illustrative and not restrictive, the scope of the invention being indicated by the hereafter appended claims rather than by the foregoing description, and all changes which come within the meaning and range of equivalency of the claims are therefore intended to be embraced therein.

What is claimed is:

1. In an offshore system for laying a continuous length of pipe on the sea bottom, including a pipe-carrying reel adapted to be mounted on a carrier vessel; reel support means for rotatably mounting said reel to a sufficiently large clear-deck area of said carrier vessel; means for driving said reel in a first direction for spooling pipe onto said reel and for exerting a desired braking action on the reel while unspooling pipe from the reel in a second direction to maintain the unspooled pipe under desired tension; improved pipe handling and conditioning means for working on said unspooled pipe, comprising:

straightener assembly support means adapted to be mounted to the carrier vessel downstream of the reel in the direction of pipe unspooling;
 pipe straightening means for imparting a reverse plastic bending moment to the unspooled pipe passing therethrough sufficient to remove at least a substantial portion of the plastic bending moment imparted to the pipe during spooling to thereby substantially straighten the unspooled pipe;
 straightener carriage means mounting said pipe straightening means to said straightener assembly support means for movement
 (1) about a pivot axis substantially parallel to the rotational axis of said pipe carrying reel,
 (2) in a substantially vertical direction relative to the deck of said carrier vessel, and
 (3) in a direction substantially parallel to the rotational axis of said reel; and
 straightener drive means for driving said pipe straightening means in a direction substantially parallel to the rotational axis of said reel to level wind pipe being spooled onto said reel.

2. Apparatus according to claim 1, wherein said pipe straightening means comprises at least first and second reaction means for exerting a reverse bending force on the pipe, wherein the second reaction means exerts a force on the pipe in substantially opposite direction from reaction forces exerted on the pipe by the first reaction means, at least one of said first and second reaction means being adjustable relative to the other reaction means in a direction substantially normal to a nominal pipe path through the pipe straightening means to thereby adjust the magnitude of the reverse plastic bending moment imparted to the unspooled pipe.

3. Apparatus according to claim 2, wherein said first reaction means comprises a first pair of pipe support roller means aligned along the pipe path and mounted
 for rotational movement about respective rotational axes substantially normal to said pipe path and substantially parallel to the plane of the deck of the carrier vessel, and for pivoting movement about a pivot axis located between and substantially parallel to said respective rotational axes, to thereby provide a multipoint pipe support at said first reaction means.

4. Apparatus according to claim 3, wherein second reaction means comprises a second pair of pipe support roller means aligned along the pipe path and mounted
for rotational movement about respective rotational axes substantially normal to said pipe path and substantially parallel to the plane of the deck of the carrier vessel, and
for pivoting movement about a pivot axis located between and substantially parallel to said respective rotational axes, to thereby provide a multipoint pipe support at said second reaction means.

5. Apparatus according to claim 2, 3, or 4, further comprising a forward pair of pipe support roller means mounted to said pipe straightening means along the pipe path upstream, in the direction of unspooling, of the first and second reaction means and mounted
for rotational movement about respective rotational axes substantially normal to said pipe path and substantially parallel to the plane of the deck of the carrier vessel, and
for pivoting movement about a pivot axis located between and substantially parallel to said respective rotational axes, to thereby provide a multi-point pipe support means.

6. Apparatus according to claim 2, 3, or 4, wherein said pipe straightening means further comprises third reaction means for exerting a force on the pipe in substantially the same direction as the force exerted on the pipe by said first reaction means.

7. Apparatus according to claim 6, wherein said third reaction means comprises at least one roller means mounted for rotation about a rotational axis substantially parallel to the rotational axes of the pipe support roller means of said first and second reaction means.

8. Apparatus according to claim 6, further comprising a forward pair of pipe support roller means mounted to said pipe straightening means along the pipe path upstream, in the direction of unspooling, of the first and second reaction means and mounted
for rotational movement about respective rotational axes substantially normal to said pipe path and substantially parallel to the plane of the deck of the carrier vessel, and
for pivoting movement about a pivot axis located between substantially parallel to said respective rotational axes, to thereby provide a multi-point pipe support means.

9. Apparatus according to claim 2 or 4, wherein said pipe handling and conditioning means further comprises:
a straightener platform mounting said straightener carriage means for movement therealong, said straightener drive means being mounted to said straightener platform for driving said carriage means along said platform; and
platform mounting means mounting said platform to said straightener assembly support means for vertical adjustment of said platform relative to the carrier vessel deck, whereby said platform may be adjusted to one of a plurality of operating heights above said carrier vessel deck.

10. Apparatus according to claim 9, wherein:
said straightener assembly support means comprises a plurality of support members, each having a plurality of platform supports, located at spaced vertical intervals; and
said platform mounting means comprises catch means for releasably engaging said platform supports on said upright members to support said platform at a predetermined height above the carrier vessel deck.

11. Apparatus according to claim 10, further comprising:
pipe guide means adapted to be mounted to the carrier vessel downstream of the straightener support assembly in the direction of pipe unspooling and movable in a direction substantially parallel to the rotational axis of the reel to guide pipe into the water as it is being unspooled.

12. A system according to claim 11, further comprising means coupling said pipe guide means and said pipe straightening means together for concurrent movement in the same direction substantially parallel to the rotational axis of the reel.

13. A system according to claim 1, 2, or 4, wherein said pipe straightening means is pivotable to adjust the lay angle at which the pipe enters the water.

14. A system according to claim 13, wherein the lay angle is adjustable between about 0° and 60°.

15. A system according to claim 14, wherein the lay angle is between about 5° and 35°.

16. Apparatus according to claim 1, 2, or 4, further comprising pivot mounting means pivotably coupling said pipe straightening means to said straightener carriage means, said pivot mounting means comprising shafts extending laterally outwardly from said pipe straightening means approximately midway between the fore and aft longitudinal ends of said pipe straightening means, said shafts seating in corresponding bearing seats of said carriage means.

17. Apparatus according to claim 16, further comprising: plate-like members fixed to said pipe straightening means, adjacent said shafts, said plate-like members containing a plurality of through holes arranged in an arcuate pattern having a center of radius substantially coincident with the straightener means pivot axis, wherein said through holes may be aligned with openings in said carriage means; and locking members insertable through aligned openings in said plate-like members and said carriage means for locking the pipe straightening means in a selected one of a plurality of rotated positions.

18. Apparatus according to claim 1, 2 or 4, further comprising:
pipe guide means adapted to be mounted to the carrier vessel downstream of the straightener support assembly in the direction of pipe unspooling and movable in a direction substantially parallel to the rotational axis of the reel to guide pipe into the water as it is being unspooled.

19. Apparatus according to claim 18, wherein said pipe guide means comprises:
a base;
a roller bed pivotably mounted to said base for rotational movement about a pivot axis lying substantially parallel to the rotational axis of said reel;
a first pair of rollers mounted to said roller bed forward of said roller bed pivot axis;
a second pair of rollers mounted to said roller bed aft of said roller bed pivot axis; and
means mounting first and second pairs of rollers to said roller bed for independent movement toward or away from the nominal longitudinal axis of pipe passing through said pipe guide means.

* * * * *